Oct. 3, 1944.    R. S. McKAY    2,359,714
METHOD OF CONTROLLING WOOD PULP COOKING
Filed Nov. 7, 1939    2 Sheets-Sheet 1
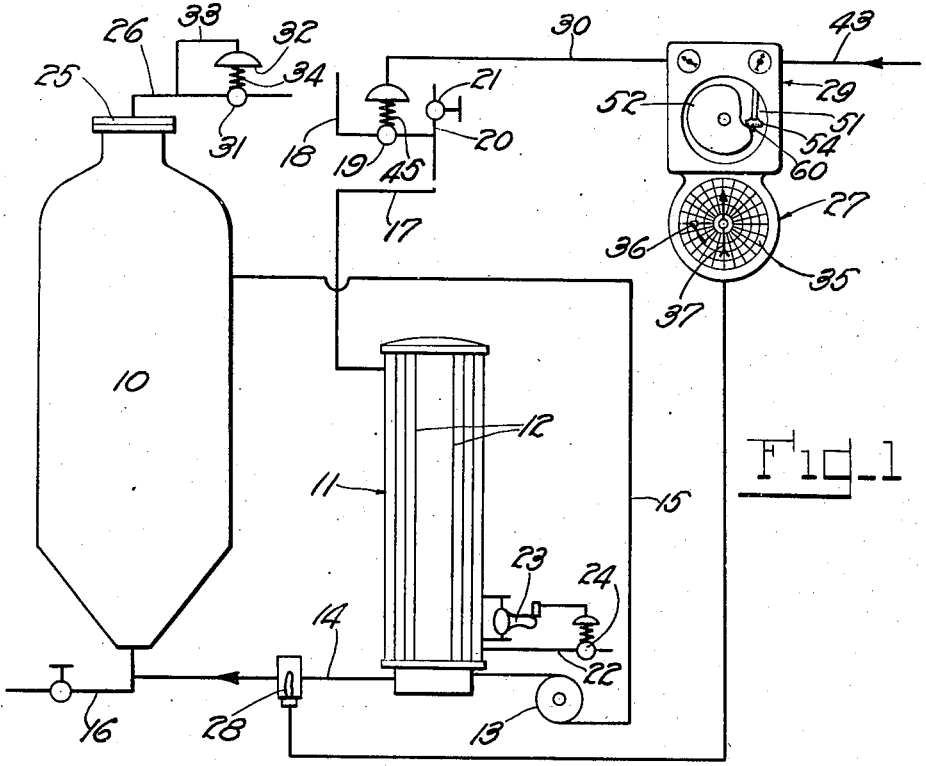
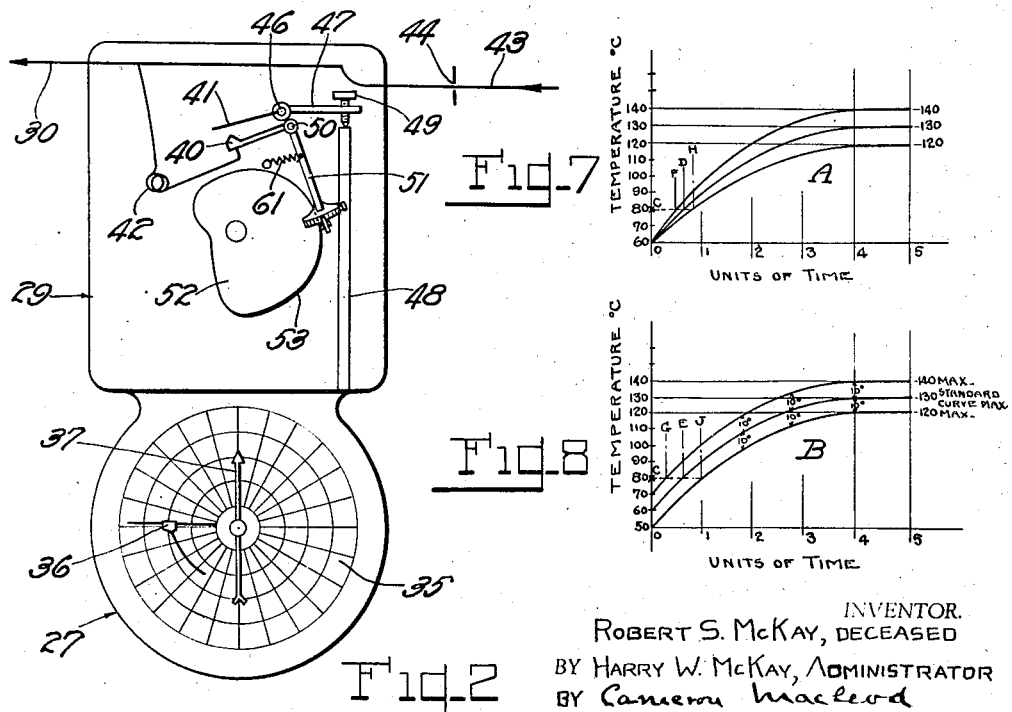
INVENTOR.
ROBERT S. McKAY, DECEASED
BY HARRY W. McKAY, ADMINISTRATOR
BY Cameron MacLeod
ATTORNEY.

Oct. 3, 1944.  R. S. McKAY  2,359,714

METHOD OF CONTROLLING WOOD PULP COOKING

Filed Nov. 7, 1939  2 Sheets-Sheet 2

INVENTOR.
ROBERT S. McKAY, DECEASED
BY HARRY W. McKAY, ADMINISTRATOR
BY Cameron MacLeod
ATTORNEY.

Patented Oct. 3, 1944

2,359,714

UNITED STATES PATENT OFFICE 2,359,714

METHOD OF CONTROLLING WOOD PULP COOKING

Robert S. McKay, deceased, late of Marlboro, Mass., by Harry W. McKay, administrator, Dedham, Mass., assignor to Mason-Neilan Regulator Company, Boston, Mass., a voluntary trust of Massachusetts Application November 7, 1939, Serial No. 303,235

2 Claims. (Cl. 92—7)

This invention relates to the control of wood pulp cooking as carried on in digesters for the processing of paper stock, and generally to the control of the cooking cycle both in respect to temperature and pressure. More specifically, the invention is adapted to control successive digester cooks where control point conditions are critical and the cook must be performed in accordance with a definite plotted curve in respect to time, but may vary in respect to value from one cook to another depending on the operating conditions.

In the control of sulphite digesters it is customary to raise the temperature of the cook gradually to a predetermined end point over a given time period, to maintain the end point temperature for a definite time, and finally to reduce the temperature at the end of the cook. For example, the cook may start at a temperature of 60° C., be gradually raised over a four-hour period to 130° C. for a period of two hours or more, and finally be reduced to the end of the cook. While the period of temperature rise and of maximum temperature has been found to be substantially constant under a given set of operating conditions at a particular plant, it has been necessary to vary the temperature end point to meet the requirements of the cook depending on the kind of wood used, strength of acid, size of chip, and other factors entering into the process.

As is well known to those skilled in the art, the control of a sulphite digester presents a difficult problem because of the formation of a lignin sulphonic acid which results in the build-up of a so-called "false pressure" and for that reason renders the control problem more difficult. It was found essential, therefore, to govern the cook with extreme accuracy in accordance with a plotted cooking curve in respect to both temperature and pressure.

Where automatic control devices have been employed, it is common to use an instrument responsive to the acid solution temperature and to guide the setting of the control instrument automatically in respect to time by means of a clock-driven cam adapted to vary the cook temperature in accordance with a predetermined cook cycle. At first a small cam mounted on the clock shaft was used, and while this was an improvement over the old hand reset method, it was not found to be entirely satisfactory because due to the relatively small operating surface of the cam it was practically impossible to cut the cam accurately to any predetermined value curve. For this reason the operator is forced to reset the instrument shortly before the maximum temperature is reached in the time cycle, to make sure that the exact end point temperature required is obtained. It was, therefore, the practice to use a single cam for successive cooks and for the operator to reset the instrument in the latter part of the period of temperature rise to the end point required for that particular cook.

To obviate the difficulties and inaccuracies caused by the small cam, a large cam having an operating surface substantially coincident with a plotted curve on a temperature chart of standard size was used. Such a cam can be cut accurately to the desired curve and provides an adequate amount of movement to the instrument reset mechanism, so that the actual control curve is within the required limits of accuracy and it is unnecessary for the operator to reset the instrument at any time throughout the cycle. This method of control, however, has been open to the objection that while it affords accurate control for a given cook, a separate cam must be provided for each successive cook if the end point temperature varies, unless the operator resets the instrument by hand. It has, therefore, been customary for many instrument manufacturers to supply separate cams to take care of the operating conditions for various cooks.

Under normal conditions the range of end point temperature change from one cook to another has been found to be substantially from 120° C. to 140° C., with the requirement that settings must be at one-degree intervals. To meet this requirement the practice has been to supply the control instrument with as many as twenty cams, each cut for the same initial temperature but with a different degree of end point temperature within the temperature range. This is a very considerable source of expense and is inconvenient to the operator, for in many types of control mechanism it is necessary to recalibrate the instrument every time a new cam is installed to make sure that the recording or indicating mechanism will show a correct reading. Such an adjustment requires a certain amount of skill and may not always be within the ability of the operator. Various types of adjustable cams have been considered; but the nature of the control curve demands that at least three adjustments be made, and the construction is too complicated to be practical.

It is an object of this invention to provide automatic means for accurately controlling successive cooks by the use of a master cam whereby the control point may be readily varied to meet the conditions of each cook without the necessity of calibrating the instrument. In carrying out this invention the initial temperature point is changed by an amount corresponding to the extent of change in the end point temperature instead of adhering to the original initial point and changing the end point only, as has been done heretofore. This is accomplished by providing a master cam which substantially represents a midpoint in the end point temperature range, and by providing an adjustable follower by which the instrument set arm may be moved within or without the cam periphery. It has been found from actual experience that all cooks throughout the end point range may be controlled in this manner and equally as good results obtained as when individual cams are used.

It is a further object of this invention to provide means for controlling the digester cook which are readily adaptable to varying plant practices and by which the cooking process may be performed with a view to economy and quality of product commensurate with plant conditions.

While the control of digester temperature has been particularly referred to herein, the digester pressure may be governed and varied in accordance with a predetermined curve in respect to time as required in the cooking process. This may be accomplished by controlling the digester outlet to maintain the desired pressure during the cook by a pressure responsive instrument reset by an automatic time mechanism embodied in this invention.

In the drawings:

Fig. 1 is a diagram of a wood pulp digester and control apparatus embodying this invention.

Fig. 2 is an enlarged detail of an instrument provided with a master cam, follower arm, and follower with setting scale embodied in this invention, showing the arm set to maintain a mid-temperature in the temperature range.

Figs. 7 and 8 are graphs showing for purposes of illustration comparative temperature control curves obtained both by independent cams and by means embodying this invention for various predetermined end point control settings.

Figure 3:
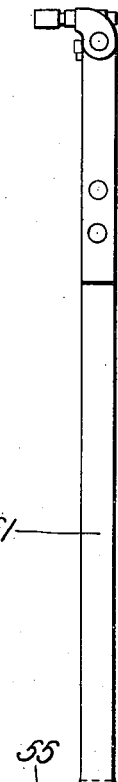
Fig. 3 is an enlarged detail in plan of the follower arm, follower, and scale, showing the arm set to maintain a higher temperature in the temperature range.
Figure 4:
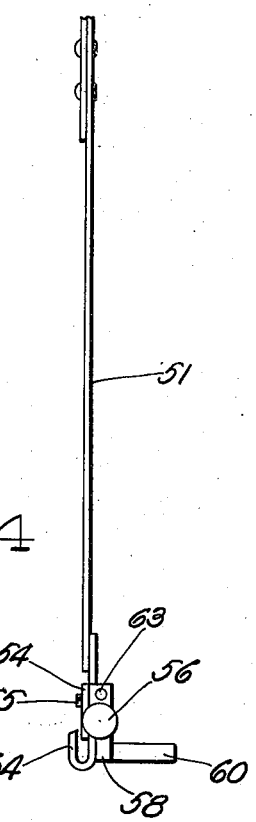
Fig. 4 is a side elevation of the device shown in Fig. 3.
Figure 5:
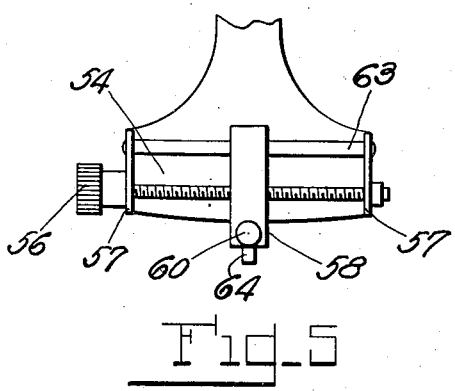
Fig. 5 is a rear view of the follower mechanism illustrated in Figs. 3 and 4, showing the follower in the mid-position.

Having reference to the drawings, there is shown in Fig. 1 a digester 10, which may be of any usual construction and is preferably provided with a heat exchanger 11 having tubes 12 through which an acid solution may be circulated to the digester by a pump 13 and pipes 14 and 15, an acid supply pipe 16 being also indicated. At 17 is a steam inlet line which may be supplied by a live steam line 18 controlled by a motor valve 19 and also supplied by an exhaust line 20 having a hand valve 21, the condensate being removed through a discharge line 22 as governed by a level control device 23 by which a motor valve 24 is actuated. The digester may also be provided with a cover 25 for charging and with a vapor relief line 26.

To control the admission of steam to the heat exchanger there is shown the motor valve 19 of the diaphragm operated type adapted to be governed by an instrument in the form of a potentiometer recorder 27 connected with a thermocouple 28 in the acid return line 14 and having an air operated head 29, the head being designed to actuate the motor valve through an air operating fluid connection 30. A back pressure valve 31 located in the vapor discharge line 26 may be used to govern the digester pressure. The valve may be operated by a diaphragm 32 responsive to digester pressure through a pipe 33, the pressure setting being governed by a spring 34 or similar device. While a back pressure valve of the type shown may be used, it will be understood that it may be replaced if desired by a motor valve governed by an instrument responsive to digester pressure and having a time cycle reset mechanism similar to that herein disclosed.

The potentiometer recorder 27 may be provided with the usual recording chart 35, pen 36, and indicator 37, which serve to keep a record of and to indicate the digester temperature. While a potentiometer is herein shown as a means responsive to digester temperature, the response may be obtained through a thermal system and control couple or pilot valve of the kind employed in air operated instruments.

The air operated head 29 is mounted on the potentiometer 27 and is provided with a nozzle 40 and flapper 41 which together form a control couple for governing operating fluid pressure in a flexible nozzle line 42 to which air, for example, may be supplied under pressure from a source not shown through a pipe 43 having a restricted orifice 44 of less capacity than the nozzle 40. The nozzle line 42 is connected with the motor valve 19 through the pipe 30 referred to above and the valve 19 assumes an opening in accordance with the nozzle pressure. As herein shown, the motor valve 19 is direct acting, i. e., it closes on an increase in diaphragm pressure and opens on a decrease in diaghragm pressure under the influence of a spring 45.

The flapper 41 is pivoted at 46 and actuated by an arm 47 adjustably connected with a potentiometer push rod 48 by a micrometer screw 49. The push rod 48 is raised and lowered by the potentiometer mechanism, not shown, in accordance with variations in acid solution temperature. The nozzle 40, pivoted at 50, is operated by a follower arm 51 positioned by a cam 52 which is driven by a conventional clock mechanism not shown.

The parts are so arranged that on a decrease in digester temperature the recording pen 36 shows a corresponding decrease in temperature on the chart 35 and the push rod 48 is lowered a corresponding amount, thus moving the flapper 41 away from the nozzle 40, reducing the pressure in nozzle line 42 and opening the steam valve 19. On an increase in temperature the opposite occurs.

It will be understood from the operation just described that the flapper 41 controls the temperature as determined by the position of the nozzle 40. The position of the nozzle 40 is in turn determined by the position of the follower arm 51 as guided by the cam 52. When the cam 52 moves the follower arm 51 away from the cam center, the temperature setting is raised, and vice versa.

To provide means for effecting a temperature cycle in accordance with a predetermined curve in respect to time, and to set the temperature end point as required for each individual cook without incurring the objections enumerated above, the master cam 52 is employed, having a periphery cut to afford a digester temperature substantially midway of the maximum temperature range needed for the various cooks. For example, if the end points of the maximum temperature range are 120° C. and 140° C., a master cam is supplied having an operating surface 53 preferably adapted to conform to a plotted curve on a chart which may represent an initial point of 60° and an end point of 130°, the usual time periods of temperature rise, maximum temperature, and shutdown, being adhered to. While the example above has been referred to by way of explanation, it will be understood that the master cam may be formed with a temperature rise period, maximum period, and shutdown period in accordance with the practice common to all cooks of the digester at a given plant.

Means for actuating the follower arm 51 by the cam 52 include a transverse scale plate 54 rigidly secured to the free end of the follower arm by means of screws 55; a micrometer screw 56 journalled in suitable bearings 57 at the end of the scale plate 54; a follower block 58 threaded on the micrometer screw and movable laterally of the follower arm 51 on a guide 63; and a follower 60 secured to the follower block 58 and adapted to engage the edge of the cam 52 against which it is held by a suitable spring 61 attached at one end to the follower arm 51 and at the other end to the instrument head 29. The follower 60 may be positioned midway of the length of the scale plate 54 coincident with the axis of the follower arm, as shown in Fig. 2, if it is desired that the temperature curve called for by the master cam is to be followed, for example a maximum temperature point of 130° C. If a lower temperature is required for another cook, the micrometer screw 56 is turned to move the cam follower block to the right, as shown in Fig. 2, which brings the follower arm 51 inside the periphery 53 of the cam; and for a higher temperature the follower block is moved to the opposite side of the scale plate 54 (see Fig. 3), causing the setting arm to be positioned outside the periphery of the cam.

To facilitate the adjustment of the follower 60 and to enable it to be quickly and accurately positioned in accordance with the cook requirements, the plate 54 has a scale 62 calibrated in degrees of temperature to conform with the divisions of the recording chart 35. For example, if a 130° C. master cam is used, the midpoint on the scale is marked "130° C." and from that point on to the right the graduations run up to 140° C., while from that point to the left they run down to 120° C. These graduations may be accurately laid out and so spaced that a given reading on the scale plate 54 will produce a like reading on the potentiometer chart 35 throughout the operating range. To facilitate the reading and to enable the follower 60 to be positioned at any selected point on the scale 62, a pointer 64 is secured to the block 58 to indicate the position of the follower against the calibrated scale. The initial calibration between the scale 62 and the potentiometer chart 35 may be made by the micrometer screw 49, which may be adjusted as required.

Figure 6:
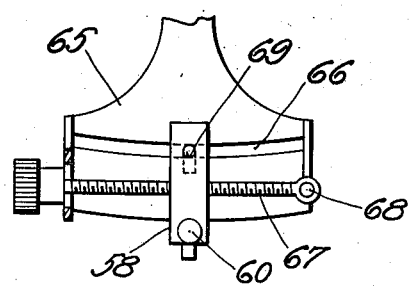
Fig. 6 is a view similar to Fig. 5, showing a modified form of follower mechanism embodied in this invention.

It is found that where a straight guide 63 is used an error is introduced due to the fact that as the follower 60 is moved away from the center of the scale 62 its distance from the follower arm pivot 50 increases. In the modified view shown in Fig. 6, a structure is provided which may be used with a linear scale to correct the error referred to. This consists of a scale plate 65 having a slot 66 which is concentric with the arc of the pen. A micrometer screw 67 is journalled in a pivoted bearing 68 at one end of the scale plate 65. The follower block 58 is threaded on the micrometer screw and is guided in the slot 66 by means of an indicating pointer 69 which extends through the slot and over the scale plate, thus acting both as a means for guiding the follower block along a concentric path and as a means for cooperating with a suitable scale arranged along the slot. By this construction the error referred to above is avoided, although the preferred construction, because of the adjustment on both sides of mid-position, is usually sufficiently accurate for the purpose.

Graph A in Fig. 7 illustrates the control curves obtained by independent cams providing the same initial temperature starting point and varying end points throughout a four-hour period. These include a 140° C. curve, a 130° C. curve, and a 120° C. curve, each of which has the same 60° C. starting point.

Graph B in Fig. 8 represents the curves as afforded by the master cam having the end points referred to above. The mid-position curve has a 60° C. starting point, which is identical with the 130° C. curve of graph A, and the other curves have starting points which vary from the 60° C. starting point by amounts corresponding to the variations of the end points, namely starting points of 70° C. and 50° C. respectively.

Assuming that the charge temperature is 80° C., indicated at point C in both graphs, it will be noted that heat is applied to the charge by the cam on the 130° C. curve shown in graph A at point D and in graph B at point E, the lapse of time as indicated by lines CD and CE being equal. It will be further noted that where a cam is used providing at 140° C. curve shown in graph A, heat will be applied at F representing a lapse of time CF which is somewhat longer than a corresponding line CG shown in graph B, provided by this device; whereas where a cam is used which effects a 120° C. curve, heat is applied at H in graph A, representing a lapse of time CH which is somewhat shorter than the corresponding lapse of time CJ indicated in graph B. While there is some variation in lapse of time before heat is applied for corresponding curves, as illustrated in the graphs, actual experience has shown that under the operating conditions of various digester cooks throughout the required temperature end point range, there is no noticeable difference in results obtained. The critical part of the temperature rise period in sulphite digester cooking is during the latter part of the rise when higher temperatures are encountered and sulphurous acid gases are being freely liberated, and during the initial part of the cook the temperature curve may be changed within the limits noted without any noticeable effects. In carrying on digester cooking in accordance with the method and means herein disclosed, advantage is taken of this fact and the initial temperature settings are raised during the early part of the cook, but intermediate temperatures are adhered to closely at the required times from the 110° C. point on to the end point temperature, the latter having been predetermined and set previously. It has been found that 110° C. is the average value at which the critical condition of the cook begins, but this value may vary a few degrees one way or the other depending on conditions.

It will be understood that the charge temperature will vary in actual practice, thus moving point C up or down the scale shown in Figs. 7 and 8 with corresponding relocation of points F, D, H, in Fig. 7 and G, E, J, in Fig. 8, but such changes occurring in the early part of the cook have no noticeable effect in the results obtained.

Infrequently, conditions of operation necessitate a change in the value of the control pressure at which the cook is to be carried out, and the same adjustable features eliminate the objectionable necessity for changing the cam.

In the claims:

1. The method of controlling a series of cooks in a pulp digester each requiring different temperatures at different periods during the cook, and the several cooks requiring different maximum temperatures, which comprises, raising the temperatures of the respective cooks from initial values to predetermined maximum values in accordance with temperature value curves which are parallel throughout their lengths.

2. The method of controlling a series of cooks in a pulp digester each requiring different temperatures at different periods during the cook, and the several cooks requiring different maximum temperatures, which comprises, raising the temperatures of the respective cooks from initial values to predetermined maximum values and thereafter reducing the temperatures of the respective cooks in accordance with temperature value curves which are parallel throughout their lengths.

HARRY W. McKAY,
*Administrator of the Estate of Robert S. McKay, Deceased.*